United States Patent [19]

Allison

[11] Patent Number: 4,746,105

[45] Date of Patent: May 24, 1988

[54] FILTERS AND VALVES

[75] Inventor: William Allison, Preston, England

[73] Assignee: Parkman Group Professional Services Limited, Liverpool, England

[21] Appl. No.: 901,897

[22] Filed: Aug. 28, 1986

[51] Int. Cl.$^4$ .............................. F16F 9/34; B03C 1/30
[52] U.S. Cl. ...................... 267/174; 55/100; 55/520; 251/902
[58] Field of Search ............... 55/100, 282, 304, 520; 251/902; 267/166, 167, 174, 175, 179, 180

[56] References Cited

U.S. PATENT DOCUMENTS

| | | | |
|---|---|---|---|
| 3,068,628 | 12/1962 | Balzer et al. | 55/282 X |
| 3,077,206 | 2/1963 | Graham | 251/902 X |
| 3,151,628 | 10/1964 | Heckert | 251/902 X |
| 3,169,550 | 2/1965 | Reader | 251/902 X |
| 3,884,447 | 5/1975 | Alexander et al. | 251/902 X |

FOREIGN PATENT DOCUMENTS

| | | | |
|---|---|---|---|
| 2856446 | 7/1980 | Fed. Rep. of Germany | 251/902 |
| 0109253 | 8/1979 | Japan | 55/304 |
| 480308 | 2/1938 | United Kingdom | 55/520 |
| 766279 | 1/1957 | United Kingdom | 55/520 |

*Primary Examiner*—Duane A. Reger
*Attorney, Agent, or Firm*—Christie, Parker & Hale

[57] ABSTRACT

The present specification discloses an adjustable element for use in a filter or valve. The element comprises a coiled spring, tension or compression, which can be extended or contracted by suitable means to vary the degree of filtration and flow-through cross-section. The present invention provides an adjustable element with the individual spring coils having a generally square or rectangular transverse cross-section, the surface of the coils being surface-hardened. The interengaging surfaces of the individual coils can be flat so that the coils engage squarely, or curved for tangential contact. The smooth outer and inner surface of the element reduce the rate of filter cake build-up, and together with the surface hardening, facilitate the accurate control of the adjustment of the element.

19 Claims, 2 Drawing Sheets

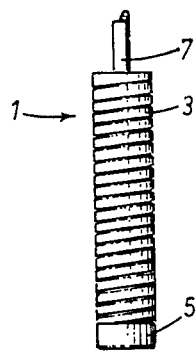 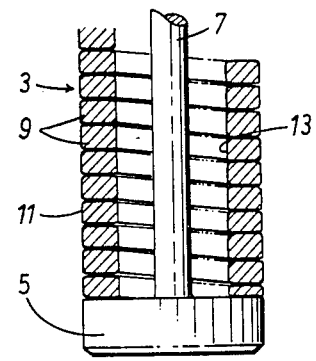
Fig 1    Fig 2
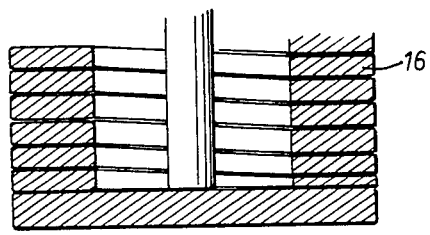 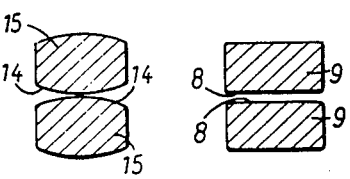
Fig 3    Fig 2B    Fig 2A
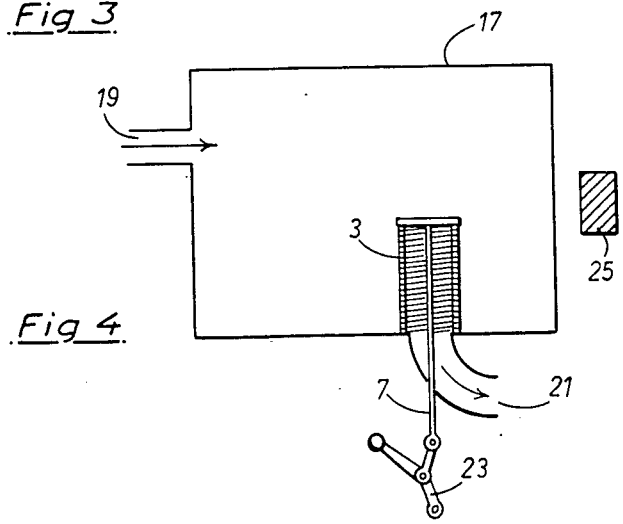
Fig 4

FILTERS AND VALVES

DESCRIPTION

1. Field of the Invention

The present invention relates to an adjustable element for use in a filter or valve.

In particular the present invention relates to an adjustable element formed by a coiled spring member, which can be used either as an adjustable filter element or as a valve closure member.

2. Background of the Invention

Considering solely the filter art, adjustable coiled spring filter elements are known. Such filter elements employ either a tension or compression spring, the axial length of which can be adjusted to vary the gap between adjacent coils, to thus adjust the filter size, a good surface match being required between adjacent coils. Such filter springs are closed at one end and the fluid to be filtered is passed either through the open end of the spring and out through the gaps between adjacent coils, or vice-versa. With such a tension or compression spring filter element the coiled spring can either be fixed at both ends to the structure of a filtration unit with the structure at one or both ends of the spring being moveable to adjust the filter gap, or the spring can be secured at its open end to the structure of the filtration unit, with an actuator rod extending through the spring. In the latter case with a compression spring, the actuator rod is a tie rod which is secured to the closed end of the spring. In the case of tension spring filter elements the actuator rod may be a push rod or a tie rod which merely engages the closed end of the spring. However, in all such filter elements the coiled spring has coils with a circular or oval transverse cross-section. Thus, when operating with a small filtration gap between adjacent coils, the relatively small radius curvatures of the individual coils presents a generally wavy profile for the surface of the spring both inside and out, which profile facilitates a build-up of filter cake on the spring. In addition to the above problem and disadvantages, the above coiled filter springs are usually manufactured so that the surfaces of the coils are relatively rough in microscopic terms. Thus, when requiring microscopic filtration gaps, accuracy is not possible due to the relative roughness of the adjacent coil surfaces. Further, due to the required spring rating of the spring determining the necessary transverse dimensions of individual coils, there is a limit to the spiral length of the filtration gap per unit axial length of the spring, especially when considering the circular or oval configuration of the known filtration spring coils.

If the above known coiled spring filter elements were to be used as valve closure members, the same problems and disadvantages as outlined hereabove would in the main apply. In particular the relatively rough surfaces of the coils would prevent the spring from being closed completely.

SUMMARY OF THE INVENTION

Bearing the above in mind the aim of the present invention is to provide an adjustable element which can be used as a positive valve closure element or as an accurate and efficient filter element, especially when requiring a microscopically small filtration gap.

According to the present invention there is provided an adjustable element for use in a filter or valve, said element comprising a coiled spring, the individual coils of the spring having a generally square or rectangular transverse cross section, with the surface of said coils being surface hardened.

In a preferred embodiment of the present invention, for use as a filter element, the coiled spring is a closed tension spring, the coils having a generally square transverse cross-section. The coils may have square or radiused i.e. curved, interengaging end faces. By virtue of the generally square cross-section of the coils the coils engage together to present a substantially smooth outer and inner surface. These outer and inner surfaces of the spring thus present little, if anything, for filter cake to grip and thus any build-up of filter cake on the element is easily removed. Additionally, as the surfaces of the coils are hardened by, for example, cold rolling during manufacture of the two non-contacting surfaces, the coils have substantially smooth mating surfaces which enables small filtration gaps, e.g. less then 10 microns, to be accurately and uniformly achieved throughout the length of the filter element.

In an alternative embodiment of the present invention, the spring coils have a generally rectangular transverse cross-section with the longer diameter of the cross-section, arranged radially of the spring. In this way the required amount of metal can be provided in the coils to produce the required spring rating, whilst the spiral filtration gap per unit length of the spring, can be maximised. The above advantages of the present invention, when used as a filter element, are of course still retained in this alternative embodiment.

In either of the above embodiments, one end of the spring may be closed, with the smooth outer surface continued around the closed end. Preferably, an actuator rod extends axially through the spring and is secured to the closed end of the closed tension spring, the actuator rod extending out of the open end of the spring. In use the open end region of the spring is secured over an outlet port in part of a filtration unit, the actuator rod extending through the port and being secured as a tie rod to an actuation mechanism. Alternatively, the actuator rod need not be secured to the actuation mechanism but can act as a push rod. The actuator rod may be constructed of spring steel so that filter cake can be removed from the filter element by, for example, moving a magnet outside the filter unit and causing the filter element to distort under the effect of magnetic forces; the spring steel actuator rod returning the element to its original configuration.

While the provision of an actuator rod is preferred in the filtration mode of the present invention, the spring may be extended and compressed by any other suitable means, within the scope of this invention.

Preferably, the adjustable element of the present invention, when used as a filter element, is arranged so that fluid to be filtered is passed between the coils, into the spring so that any filter cake is formed on the outside of the element, facilitating removal as described hereabove. The adjustable element may of course be alternatively arranged so that the fluid to be filtered is first passed into the spring from one end, and then forced between the coils.

When the adjustable element of the present invention is used as a valve closure element it is preferably again in the form of a closed tension spring, the smooth hardened mating surfaces of the adjacent coils facilitating positive closure and enabling the valve to be opened by miniscule amounts. With such minimal opening being available the valve closure element may be used to, for example, aerate or introduce bubbles of gas into a fluid in which the element is immersed.

Control of the valve closure element whether as a closed tension or a compression spring, may be effected by an actuator rod in a similar manner to the actuator rod of the above described filter, or the spring may be fixed at both ends, with its fixing at one or both ends being adjustable axially of the spring. Further, it is envisaged that the spring incorporate a magnetically affected member, say at the closed end of the spring, and be magnetically extendible and/or compressible using an external magnet arrangement, e.g. solenoid.

Whilst the above filter and valve closure elements utilise closed tension springs, compression springs may be substituted, if desired, within the scope of the present invention, the hardened surface, square or rectangular cross-sectional coils with square or curved contacting surfaces, still acting with advantage. Further, as the valves and filters using an adjustable element according to the present invention, may be made solely of metal, they are especially of use in nuclear installations.

It is to be noted that any filter or valve incorporating an adjustable element according to the present invention, can be used for the fine accurate control of both liquors and gases.

BRIEF DECRIPTION OF THE DRAWINGS

The present invention will now be further described, by way of example, with reference to the accompanying drawings, in which:

FIG. 1 illustrates a preferred embodiment of the present invention for use as a filter;

FIG. 2 is a cross-sectional view of part of the filter element of FIG. 1;

FIG. 2A is an enlarged detail of the coil cross-section of FIG. 2;

FIG. 2B is an enlarged detail of a different coil cross-section suitable for the present invention;

FIG. 3 is a cross-sectional view of part of another embodiment of filter element constructed according to the present invention;

FIG. 4 is a schematic illustration showing the arrangement of the filter element of FIGS. 1 and 2, in a filtration apparatus;

Figure 5:
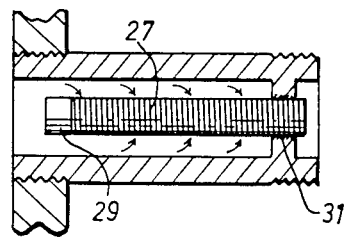
Figure 6:
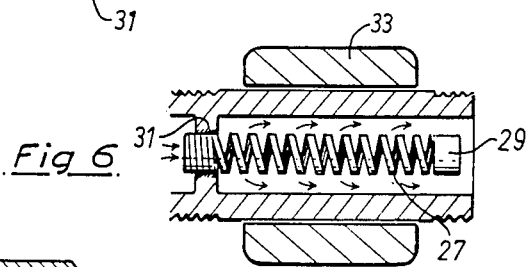
Figure 7:
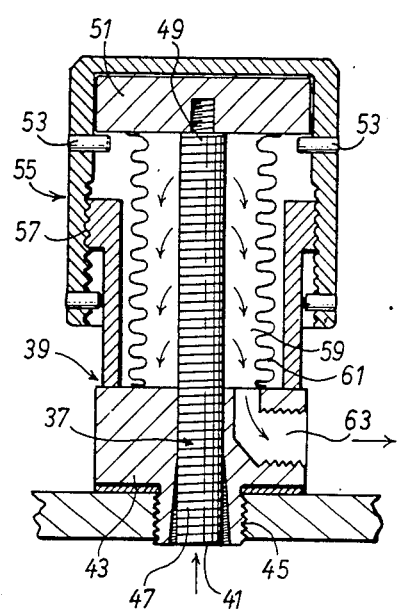
Figure 8:
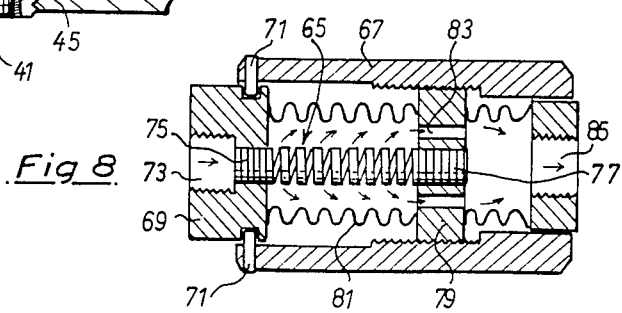

FIG. 5 schematically illustrates one embodiment of valve incorporating the present invention;

FIG. 6 schematically illustrates a further embodiment of valve incorporating the present invention; and FIGS. 7 and 8 schematically illustrate further valve constructions incorporating an adjustable element according to the present invention.

DETAILED DESCRIPTION

The adjustable elements illustrated in FIGS. 1 to 4 of the accompanying drawings are for use as filter elements. The filter element (1) shown in FIGS. 1 and 2 comprises a closed coiled tension spring (3) which is closed at one end (5), with an elongate actuator rod (7) extending axially through the coiled spring and being secured, e.g. welded, to the closed end (5).

As can be best seen on FIGS. 2 and 2A, the coils of the spring (3) each have a generally square transverse cross-section with the flat facing surfaces (8) of the adjacent coils (9) engaging squarely together in the fully closed condition. In this way, the spring (3) presents a substantially smooth external and internal surface (11,13) so that there is little, if anything, on which filter cake can grip. The closed end (5) is also smoothly continuous with the external surface (11), to thus reduce the availability for grip for filter cake. Further, the surface of the spring coils (9) is hardened by a process which ensures a relatively smooth surface which facilitates the spring both positively closing with adjacent coils interengaging each other, and being able to accurately provide an adjustable miniscule filter gap uniformly along the spring length. These hardened surfaces can be provided by, for example, initially cold rolling round steel wire to produce substantially square cross-section wire, the wire being subsequently wound to form a spring.

In an alternative embodiment (FIG. 2B) the interengaging surfaces (14) of adjacent, generally square cross-section coils (15), are radiused i.e. curved to provide for good tangential contact.

To maximise the length of the spiral filter gap per unit length of spring, the transverse cross-section of the spring coils (16) can be made substantially rectangular as shown in FIG. 3, without any loss of material and with therefore the same spring rating being retained as with the substantially square cross-section of FIGS. 1 and 2.

The filter element of FIGS. 1 and 2 can be used in the filtration unit schematically illustrated in FIG. 4. This filtration unit comprises a housing (17) which has an inlet (19) and an outlet (21). The filter element of FIG. 1 is located within the housing (17) with its open end secured over the outlet (21), the actuator rod (7) extending out of the unit and being secured as a tie rod, to an actuation mechanism (23). By operation of the actuation mechanism (23) the coiled spring (3) can be extended to provide the required filter gap between adjacent coils. Fluid to be filtered can then be passed through the unit with any filter cake being formed on the outside of the coiled spring (3). To facilitate removal of the filter cake, the actuator rod (7) is made of spring steel and a magnet (25) is movable around the housing (17). The magnet (25) causes the spring (3) and the actuator rod (7) to distort and move with the magnet (25), thus effectively cracking and shaking off the filter cake. The spring steel of the actuator rod (7) ensures that the filter element (3,7) returns to its original configuration ready for further use.

While the above describes an adjustable element constructed according to the present invention and used as a filter, FIGS. 5 to 8 of the accompanying drawings illustrate the element of FIGS. 1 and 2, omitting actuator rod (7), used as various forms of valve.

The valve illustrated in FIG. 5 comprises a valve closure element (27) formed by a closed tension spring which is closed at one end region (29) and supported at the other end region (31). This element (27) forms a basic one-way valve in a valve housing (32), the closure element (27) allowing fluid flow only in the direction of the arrows. To explain, the spring coils only open when there is sufficient pressure outside the spring to overcome the spring force; the square interengaging hardened surfaces (8) of the coils (FIG. 2A) ensuring a positive closing of the valve. Alternatively, the interengaging hardened surfaces (14) can be curved to provide for tangential contact therebetween (see FIG. 2B).

The valve illustrated in FIG. 6 differs from that of FIG. 5, solely in that the spring can be extended, as and when desired, to open the valve to the desired extent, by operation of the solenoid (33). The extent to which the valve is opened, i.e. the extent to which the spring is extended, can be varied by the variation of the magnetic field produced by the solenoid (33).

The valve illustrated in FIG. 7 comprises an adjustable closure element (37) which is secured within a two-part casing (39,55). The casing (39,55) comprises a lower cylindrical part (39) which is provided with an inlet port (41) in its base (43), the base (43) being threaded as at (45) and, in use, screwed onto a feed supply. The inlet port (41) connects with one end (47) of the adjustable closure element (37), the other end (49) being closed and secured to a member (51) which is held axially, though rotatably, by pins (53) within the upper cylindrical part (55). The upper cylindrical casing part is screw threadedly engaged, as at (57), to the lower casing part (39). Thus by rotating the upper casing part (55) on the threaded (57), the adjustable closure element (37) which is in the form of a closed tension spring, can be varied in length to open or close the valve, fluid flowing through the closure element (37) to a chamber (59) defined by a flexible bellows (61), and thence to an outlet (63). The substantially square or rectangular cross-section of the tension spring together with the squared or radiused, hardened coil surfaces ensure positive closing and accurate control of the smallest of flow paths.

The valve of FIG. 8 has an adjustable closure element (65) again in the form of a closed tension spring. This spring (65) is secured within a hollow cylindrical housing (67) which is rotatably fixed to a base (69) by dowel pins (71). The base (69) has an inlet (73) to which the open end (75) of the spring (65) is secured, the other closed end (77) of the spring (65) being secured to an annular member (79), the periphery of which is screw threadedly engaged with the inside wall of the cylindrical housing (67). Rotation of the cylindrical housing (67) on the base (69), thus causes the annular member (79) to move axially within the housing varying the length of the spring (65) and thus opening and closing the valve to varying extents. When the valve is open, fluid can flow out into the chamber defined by the bellows (81) and through ports (83) in the annular member (79), to the outlet (85).

The above described filters and valves can be of an all metal construction and can thus be of extreme importance in nuclear installations. Further, with regard to filters and valves incorporating an adjustable element according to the present invention, due to the close interengagement of the coils and the available accurate adjustment thereof, filtration and control of both liquors and gases is possible. For example, in a valve application, a gas or air can be passed through an adjustable element of the present invention, which is immersed in a fluid, the controlled gap between the coils being only large enough to allow the gas to seep into the fluid. Such is the accuracy of fine adjustment available with the hardened surface, substantially square or rectangular cross-section, coils of the present invention.

While the above description refers to closed tension springs, the present invention is also applicable to compression springs.

The present invention thus provides an adjustable element which is suitable for both filter and valve usage, the element being capable of fine and accurate adjustment.

I claim:

1. An adjustable element for use in a fluid treatment apparatus, said element comprising a coiled spring, the individual coils of the spring having a generally rectangular transverse cross-section, with the surface of said coils being surface-hardened, the coils each having curved tangentially interengaging end faces, and substantially planar surfaces lying substantially parallel to the axis of the spring, said planar surfaces thus forming substantially smooth inner and outer surfaces for the element.

2. An element according to claim 1, wherein the individual coils have a generally rectangular transverse cross-section with the larger dimension of the generally rectangular cross-section extending radially of the spring.

3. An element according to claim 1, wherein one end of the coiled spring is closed in such a manner that the smooth outer surface is continued around the closed end.

4. An element according to claim 3, wherein an actuator rod extends axially through the spring and is secured to the closed end, the actuator rod extending out of the other open end of the spring.

5. An element according to claim 1, wherein the spring is a closed tension spring.

6. An element according to claim 4, when mounted in a filter housing, a magnet being arranged to be movable when desired, to cause the spring to flex laterally.

7. An element according to claim 1, when the element is located in a valve housing, fluid pressure acting within the valve housing controlling the longitudinal extension and contraction of the spring element.

8. An element according to claim 1, when the element is located in a valve housing, an external magnet arrangement being provided to control the longitudinal extension and contraction of the spring element.

9. An element according to claim 1, wherein the spring element is mounted within a two-part valve housing, said housing parts being screw-threadedly engaged together with one end of said spring element fixedly connected to one housing part and the other end rotatably connected to the other housing part.

10. An element according to claim 1, wherein the spring element is located within a valve housing, one end region of said spring element being attached to a first member which is rotatable within the valve housing though axially fixed, and the other end region being secured to a second member which is screw-threadedly engaged with said housing so as to be rotatable and axially movable, one of said members being provided with a passage extending therethrough.

11. An adjustable element for use in a fluid treatment apparatus, said element comprising a closed tension coiled spring, the individual coils of the spring having a generally rectangular transverse cross-section, with the surface of said coils being surface-hardened, the coils each having curved tangentially interengaging end faces, and substantially planar surfaces lying substantially parallel to the axis of the spring, said planar surfaces thus forming substantially smooth inner and outer surfaces for the element, one end of the coiled spring being closed in such a manner that the smooth outer surface is continued around the closed end, an actuator rod extending axially through the spring and being secured to said closed end, said actuator rod extending out of the other open end of the spring.

12. An element according to claim 11, wherein the individual coils have a generally rectangular transverse cross-section with the larger dimension of the generally rectangular cross-section extending radially of the spring.

13. An element according to claim 11, wherein the spring is a closed tension spring.

14. An element according to claim 11, when mounted in a filter housing, a magnet being arranged to be movable when desired, to cause the spring to flex laterally.

15. An element according to claim 11, when the element is located in a valve housing, fluid pressure acting within the valve housing controlling the longitudinal extension and contraction of the spring element.

16. An element according to claim 11, when the element is located in a valve housing, an external magnet arrangement being provided to control the longitudinal extension and contraction of the spring element.

17. An element according to claim 11, wherein the spring element is mounted within a two-part valve housing, said housing parts being screw-threadedly engaged together with one end of said spring element fixedly connected to one housing part and the other end rotatably connected to the other housing part.

18. An element according to claim 1, wherein the spring element is located within a valve housing, one end region of said spring element being attached to a first member which is rotatable within the valve housing though axially fixed, and the other end region being secured to a second member which is screw-threadedly engaged with said housing so as to be rotatable and axially movable, one of said members being provided with a passage extending therethrough.

19. Filtration apparatus comprising an adjustable filter element which includes a coiled spring, the individual coils of the spring having a generally rectangular transverse cross-section, with the surface of said coils being surface-hardened, the coils each having curved, tangentially interengaging end faces and substantially planar surfaces lying substantially parallel to the axis of the spring, said planar surfaces thus forming substantially smooth inner and outer surfaces for the filter element, and means for forcing a fluid to be filtered into the spring between the coils and means for moving the coil spring between a closed position and an open position for providing filtration gaps between the coils of the spring during filtration of the liquid passing through the spring, the smooth inner and outer surfaces of the filter element reducing the rate of filter cake build up and together with the surface hardening facilitating accurate control of the adjustment of the filter element.

* * * * *